(12) United States Patent
Erb

(10) Patent No.: US 7,957,518 B2
(45) Date of Patent: Jun. 7, 2011

(54) COMMUNICATION HANDOFF BETWEEN TELEPHONE DEVICES

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1184 days.

(21) Appl. No.: 11/621,763

(22) Filed: Jan. 10, 2007

(65) Prior Publication Data

US 2007/0189482 A1 Aug. 16, 2007

(30) Foreign Application Priority Data

Jan. 27, 2006 (EP) .................................. 06250453

(51) Int. Cl.
*H04M 3/42* (2006.01)
(52) U.S. Cl. .................. 379/212.01; 379/158; 455/416; 455/417
(58) Field of Classification Search ............. 379/212.01, 379/211.04, 211.01, 158, 202.01, 204.01, 379/205.01; 455/416, 417, 414.1
See application file for complete search history.

(56) References Cited

U.S. PATENT DOCUMENTS

| 5,548,636 | A | 8/1996 | Bannister et al. |
| 6,253,088 | B1* | 6/2001 | Wenk et al. ................... 455/462 |
| 6,584,316 | B1* | 6/2003 | Akhteruzzaman et al. ... 455/445 |
| 6,674,746 | B1* | 1/2004 | Lamarque, III ............... 370/352 |
| 7,120,241 | B1* | 10/2006 | Fuoss et al. ............. 379/212.01 |
| 7,400,886 | B2* | 7/2008 | Sahim et al. .................. 455/444 |
| 7,424,288 | B2* | 9/2008 | Jung et al. ..................... 455/416 |
| 7,424,289 | B2* | 9/2008 | Levien et al. ................. 455/417 |
| 2006/0166695 | A1* | 7/2006 | Morich ...................... 455/550.1 |

FOREIGN PATENT DOCUMENTS

EP 1071246 A1 1/2001

OTHER PUBLICATIONS

"Hicom 300 Telephone Concepts", Siemens Data Sheet, 1992, pp. 12-31.

* cited by examiner

*Primary Examiner* — Olisa Anwah

(57) ABSTRACT

A method of moving telephone communication from a first device engaged in a call, to a second device. The method includes initiating a determination of status of the first device from the second device, joining the second device to the call to form a conference in response to an active call status indication, and removing the first device from the conference, leaving the second device engaged in the call.

14 Claims, 1 Drawing Sheet

COMMUNICATION HANDOFF BETWEEN TELEPHONE DEVICES

FILED OF THE INVENTION

The present invention relates generally to communication systems, and more particularly to a method of moving telephone communication from one device to another.

BACKGROUND OF THE INVENTION

Twinning of two telephones allows a user to answer telephone calls at either device, typically by presenting the telephone call at a preferred device first or by presenting to the telephone call at both devices at the same time. The twinning of telephones is particularly useful for receiving telephone calls at alternate locations such as alternate office locations or when out of the office. Twinning of a land line and a cellular telephone, for example, allows a user to answer calls at either device, depending on location or mobility requirements.

After answering a telephone call at one of the twinned devices, the user must continue the call on the device used for answering until the call is completed (i.e. until the user hangs up or transfers the telephone call). It will be appreciated, that in some cases it is desirable to transfer the call to the other of the twinned devices. For example, a user that answers a telephone call on a land line may wish to move the call to a cellular telephone for added mobility. On the other hand a user who answers a telephone call on a cellular telephone may wish to move the call to a land line to take advantage of device features and capabilities such as speakerphone capability or a conference unit.

In many prior art systems, such a device change is not possible and the user must cope with continuing the telephone call at the original device rather than changing devices.

To address this issue, a user is forced to arrange an alternate telephone call with the other party by advising the other party that they will call back on another line to continue the conversation. Of course, the user can also ask the other party to call back to allow the user to answer on the alternate line. The original telephone call is then terminated and another telephone call is established by initiating or answering the call on the other telephone device. In some cases, the conversation is not continued due to the arrival of another call in the meantime or due to an interruption or other event resulting in the call not being initiated or not getting through.

Where both telephone devices are locally supported by a PBX with enabling features, a user can place the original call on hold and then initiate a remote retrieve of the held call from the other device. This requires both feature support within the PBX and an understanding of the feature by the user including feature access codes and dialing sequence to retrieve the call.

In another approach to addressing this issue, a conference is established involving both of the user devices and the other party. Such a conference again requires feature support within the PBX. As with remote retrieve, this approach requires user understanding of the conference feature.

A different technique for switching telephone communication from one twinned device to another is desirable.

SUMMARY OF THE INVENTION

In one aspect of the present invention, there is provided a method of moving telephone communication from a first device engaged in a call, to a second device. The method includes initiating a determination of status of the first device from the second device by one of automatically determining status of the first device when the second device goes off-hook and calling the first device from the second device, joining the second device to the call to form a conference in response to an active call status indication, and removing the first device from the conference, leaving the second device engaged in the call.

In one particular aspect, a telephone call is received or initiated at a first twinned device. A call (or status query) of the first twinned device is carried out from the second twinned device, followed by a call intrusion to form a conference after which the first twinned device is removed from the call. Existing feature capabilities are utilized to reduce user participation in moving the call from one twinned device to another.

Advantageously, a call connection can be moved from one device to another while maintaining the call connection. Thus, conversation can continue without interruption. Further, movement of the call connection from one device to another can be carried out regardless of whether the devices are on the same call server or PBX equipment and regardless of the switching equipment that the twinned devices are connected to.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
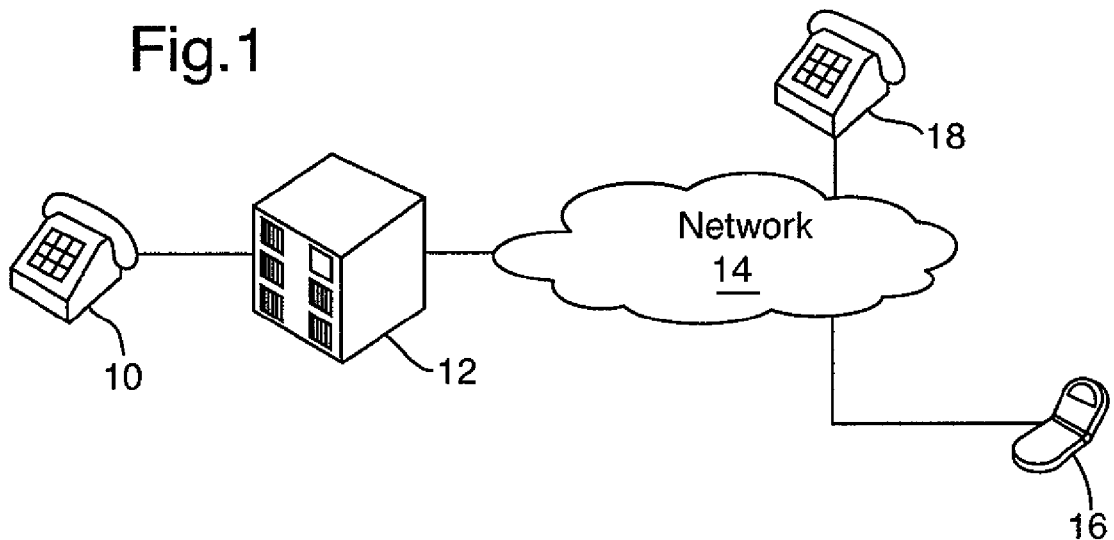
FIG. 1 is a simplified representation of a communication system for implementing a method for switching telephone communication from one twinned device to another according to one embodiment of the present invention.

Turning first to FIG. 1, a first telephone device 10 is shown connected to a PBX 12 which is, in turn, connected to a network 14. It will be appreciated that the network 14 in the present embodiment can include, for example a Public Switched Telephone Network (PSTN) including a Central Office (CO) or local exchange. Also connected to the network 14 is a second telephone device 16 and a third telephone device 18. It will be appreciated that many other telephone devices can be connected to the PBX 12 and to the network 14. For the purpose of simplicity, only three telephone devices are shown.

For the purpose of the present example, the first telephone device 10 is a desk telephone connected to the PBX 12 at a user's workplace. The second telephone device 16 is a mobile phone of the user. It will be understood by those skilled in the art that the network 14 shown in FIG. 1 also includes a wireless network and infrastructure for connection of the mobile phone of the user to the PSTN. The first and second telephone devices 10, 16, respectively, are used by the same user and are twinned to allow the user to answer calls directed to the user's first telephone device 10, at either the first telephone device 10 at the user's workplace or the second telephone device 16 (mobile phone), depending on the location or mobility requirements of the user. The third telephone device 18 is a device operated by another user. The type of device or details of which are not important for explanation of the present embodiment.

Figure 2:
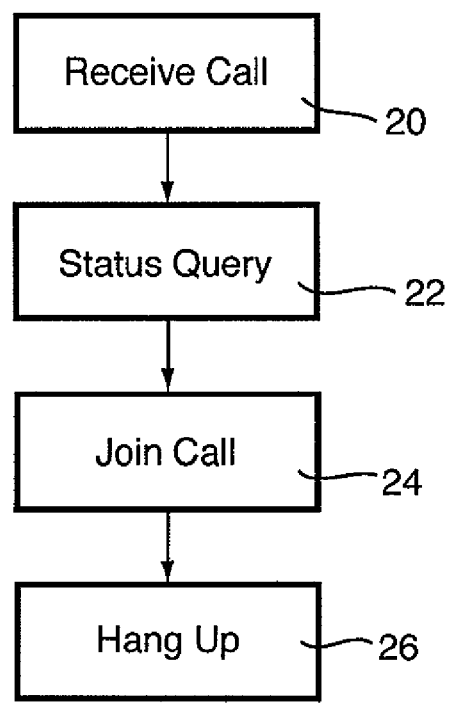
FIG. 2 is a flowchart of a method for switching telephone communication from one twinned device to another according to one embodiment of the present invention.

Referring now to FIG. 2, there is shown a flow chart of the method for moving telephone communication from one twinned device to another according to one embodiment of the present invention. To assist in the explanation, the method for moving telephone communication is described by way of example with reference to the forgoing discussion of the telephone devices 10, 16, 18, PBX 12 and network 14.

A caller first places a telephone call using the third telephone device 18 at step 20. In the present example, the caller enters the telephone number for the desk telephone 10 of the user. As indicated above, the desk telephone 10 and the mobile phone 16 are twinned telephone devices. When the caller places the telephone call from the telephone device 18, the desk telephone 10 and the mobile phone 16 both ring, allowing the user to take the call on either phone depending on feature or mobility requirements of the user. For the purpose of this example, the user answers the call using the mobile phone 16, thereby completing a voice communication connection between the third telephone device 18 and the mobile phone 16.

During the telephone call the user wishes to use the desk phone 10 to continue the voice communication. As described above, a user may wish to use a desk phone 10 to take advantage of features such as a speakerphone, not available with the mobile phone 16. The user causes the desk phone 10 to go off-hook by picking up the handset of the phone or pressing a button on the desk phone 10. Upon detecting an off-hook condition, an extension status query is performed by the PBX 12 to determine if there is a twinned device that is active on a call, the identity of the twinned device involved in the call, and whether a switch from one twinned device to another is permitted based on twinning feature settings (step 22).

In the present example, it is determined that the desk phone 10 is twinned with the mobile phone 16 and that the mobile phone 16 is involved in a telephone call.

A call intrusion is then performed at step 24. In performing the call intrusion, a call originating from the mobile phone 16 is automatically placed from the desk phone 10 to the mobile phone 16. An indication is provided with the call, identifying the call as a twinning intrusion call. Upon receipt of the twinning intrusion call, a conference call is automatically established between the mobile phone 16, the desk phone 10 and the third telephone device 18, thereby joining the mobile phone 16 to the call.

Next, hang-up of the mobile phone 16 is automatically initiated (step 26), removing the mobile phone 16 from the conference call resulting in a conference breakdown and leaving the desk phone 10 connected to the third telephone 18 device. This is accomplished as the PBX hangs up on the connection to the mobile phone 16 (on behalf of the user) and thus the mobile phone is cleared down in the same manner as if the original call was terminated.

In the above described example, the user answers the call using the mobile phone 16, thereby completing a voice communication connection between the third telephone device 18 and the mobile phone 16. In another example, the user answers the call using the desk phone 10. During the telephone call the user wishes to use the mobile phone 16 to continue the voice communication. The user originates a call to the twinned number using the mobile phone 16 and a status check is performed by the PBX (step 22). Alternatively, a softkey is used to initiate the feature. The status check is followed by the call intrusion (step 24) and hang-up (step 26), as described above.

Referring again to FIG. 2, another example of a method for moving telephone communication from one twinned device to another is described with reference to the forgoing discussion of the telephone devices 10, 16, 18 PBX 12 and network 14. Again a caller first places a telephone call using the third telephone device 18 at step 20. In the present example, the caller enters the telephone number for the desk telephone 10 of the user. As indicated above, the desk telephone 10 and the mobile phone 16 are twinned telephone devices. When the caller places the telephone call from the telephone device 18, the desk telephone 10 and the mobile phone 16 both ring, allowing the user to take the call on either phone, depending on feature or mobility requirements of the user. For the purpose of this example, the user answers the call using the mobile phone 16, thereby completing a voice communication connection between the third telephone device 18 and the mobile phone 16.

During the telephone call, the user wishes to use the desk phone 10 to continue the voice communication. The user dials the telephone number of the twinned mobile telephone 16 from the desk phone 10 at step 22. Upon dialing the telephone number of the mobile phone 16 from the desk phone 10, the user receives a busy signal from the speaker of the desk phone 10. The busy signal is a status indication that the twinned mobile phone 16 is active on a call. The mobile phone 16 is also recognized as a twinned phone by the PBX and the method proceeds to the next step.

A call intrusion is then performed at step 24, establishing a conference call between the mobile phone 16, the desk phone 10 and the third telephone device 18. Depending on capabilities of the desk phone 10, user action can be required at the desk phone 10 to form the conference.

Rather than a call intrusion, a camp-on function can be performed in which the desk phone 10 does not join to form a conference until a user action is performed at the mobile phone 16. For example, a key on the keypad or soft key on the mobile phone 16 can be selected to allow the desk phone 10 to join, depending on the functionality of the mobile phone 16.

Next, hang-up of the mobile phone 16 is initiated (step 26), removing the cellular phone 16 from the conference call resulting in a conference breakdown and leaving the desk phone 10 connected to the third telephone 18 device. The hang-up can be initiated automatically or by the user (by hanging up), depending on the capabilities of the equipment.

In the present example, the user answers the call using the mobile phone 16, thereby completing a voice communication connection between the third telephone device 18 and the mobile phone 16. It will be appreciated that the user can similarly answer the call using the desk phone 10 and move the call to the mobile phone 16.

It will be appreciated that, although embodiments of the invention have been described and illustrated in detail, various modifications and changes may be made. In each of the examples described above, a call is initiated at the third telephone device and received at one of the twinned devices. The call can also be initiated at one of the twinned devices prior to movement of the call to the other of the twinned devices. Different telephone devices can be used in the present method. For example, while the first telephone device is described as a desk phone and the second telephone device is described above as a mobile phone, it will be understood that the twinned telephone devices can be any suitable telephone devices. For example, both telephone devices can be different extensions of telephones connected to the same PBX. It will also be appreciated that for two telephone devices at different extensions of telephones connected to the same PBX, the user can dial the extension of the twinned device to initiate movement of the call. Alternatively, an additional telephone device such as a home phone connected to a landline can be twinned with the desk phone 10 and/or the mobile phone 16. Thus, more than two telephone devices can be twinned. In another example, a hotel suite can include three or more telephones that are twinned. Also, rather than automatically performing an extension status query when an off-hook condition is detected in a twinned device as described with reference to FIG. 2, the extension status query can be initiated when a user presses a feature access key, a soft key on the telephone device, or a feature access code. Alternatively, the extension status query can be initiated by dialing the extension or telephone number of the twinned telephone device. It will be appreciated that similar movement of a call from one device to another can be accomplished between telephones that are not twinned, by system configuration and use of a PIN authorization using, for example, a group call Pickup mechanism as will be understood by those skilled in the art.

Still further alternatives and modifications may occur to those skilled in the art. All such alternatives and modifications are believed to be within the scope of the invention as defined by the claims appended hereto.

What is claimed is:

1. A method of moving telephone communication from a first device engaged in a call, to a second device, the method comprising:
   from the second device, initiating a determination of status of said first device by automatically determining status of said first device when said second device goes off-hook, and calling said first device from said second device;
   determining that said first device is twinned to said second device and said first device is engaged in a call;
   determining whether or not a move is permitted from said first device to said second device;
   joining said second device to said call to form a conference in response to an active call status indication; and
   removing said first device from said conference, leaving said second device engaged in said call.

2. The method according to claim 1, wherein joining said second device to said call comprises performing a call intrusion to automatically form said conference.

3. A method of moving telephone communication from a first device engaged in a call, to a second device, the method comprising:
   from the second device, initiating a determination of status of said first device by automatically determining status of said first device when said second device goes off-hook, and calling said first device from said second device;
   camping-on said second device to said call and awaiting acceptance of said second device to said call;
   joining said second device to said call to form a conference; and
   removing said first device from said conference, leaving said second device engaged in said call.

4. The method according to claim 3, wherein joining said second device to said call further comprises receiving an indication of acceptance of said second device to said call.

5. The method according to claim 1, wherein removing said first device from said conference comprises automatically initiating a hang-up of said first device after forming said conference.

6. The method according to claim 1, wherein joining said second device to said call comprises performing a camp-on function to said call and awaiting acceptance of said second device to said call.

7. The method according to claim 6, wherein joining said second device to said call further comprises receiving an indication of acceptance of said second device to said call.

8. The method according to claim 3, wherein removing said first device from said conference comprises automatically initiating a hang-up of said first device after forming said conference.

9. A method of moving telephone communication from a first device engaged in a call, to a second device, the method comprising:
   from the second device, initiating a determination of status of said first device by automatically determining status of said first device when said second device goes off-hook;
   determining that said first device is twinned to said second device and said first device is engaged in a call;
   determining whether or not a move is permitted from said first device to said second device;
   joining said second device to said call to form a conference in response to an active call status indication; and
   removing said first device from said conference, leaving said second device engaged in said call.

10. The method of claim 9, wherein said determining steps are performed by a PBX coupled to at least one of said first or second devices.

11. The method of claim 9 further comprising the step of placing a call from said second device to said first device.

12. The method of claim 11 further comprising receiving a busy signal indication indicating said first device is engaged in said call.

13. The method according to claim 9, wherein joining said second device to said call comprises performing a camp-on function to said call and awaiting acceptance of said second device to said call.

14. The method according to claim 13, wherein joining said second device to said call further comprises receiving an indication of acceptance of said second device to said call.

* * * * *